(12) United States Patent
Kawai et al.

(10) Patent No.: US 8,061,851 B2
(45) Date of Patent: Nov. 22, 2011

(54) LAMP COOLING APPARATUS FOR ENABLING ADJUSTMENTS OF SETTING POSITIONS AND PROJECTION DISPLAY APPARATUS HAVING SUCH LAMP COOLING APPARATUS

(75) Inventors: Hiroshi Kawai, Tokyo (JP); Masanori Takenaka, Tokyo (JP)

(73) Assignee: Sony Corporation (JP)

( * ) Notice: Subject to any disclaimer, the term of this patent is extended or adjusted under 35 U.S.C. 154(b) by 610 days.

(21) Appl. No.: 11/903,197

(22) Filed: Sep. 20, 2007

(65) Prior Publication Data
US 2008/0088803 A1 Apr. 17, 2008

(30) Foreign Application Priority Data

Sep. 22, 2006 (JP) .............................. P2006-257953

(51) Int. Cl.
G03B 21/18 (2006.01)
(52) U.S. Cl. ......................................................... 353/61
(58) Field of Classification Search .................... 353/60, 353/61; 313/46; 345/373; 362/218, 264, 362/294, 547
See application file for complete search history.

(56) References Cited

U.S. PATENT DOCUMENTS

| 4,220,379 A | * | 9/1980 | Pimiskern et al. | ............. | 384/371 |
| 4,776,617 A | * | 10/1988 | Sato | ............................ | 285/145.3 |
| 6,056,329 A | * | 5/2000 | Kitani et al. | ................ | 285/145.3 |
| 6,690,577 B2 | * | 2/2004 | Chen | ............................... | 361/695 |
| 7,425,793 B2 | * | 9/2008 | Haga et al. | ....................... | 313/46 |

FOREIGN PATENT DOCUMENTS

| EP | 1475057 A1 | * | 11/2004 |
| JP | 53-80827 U | | 7/1978 |
| JP | 57-173683 A | | 10/1982 |
| JP | 6-20978 U | | 3/1994 |
| JP | 9-280447 A | | 10/1997 |
| JP | 11-084533 A | | 3/1999 |
| JP | 2000-352762 A | | 12/2000 |
| JP | 2003-157715 A | | 5/2003 |
| JP | 2006-018024 A | | 1/2006 |

OTHER PUBLICATIONS

Japanese Office Action issued in connection with Japanese Patent Appln. No. 2006-257953, Sep. 2008.

* cited by examiner

*Primary Examiner* — Thanh X Luu
(74) *Attorney, Agent, or Firm* — Lerner, David, Littenberg, Krumholz & Mentlik, LLP (57) ABSTRACT

A lamp cooling apparatus for cooling a lamp may include a lamp outlet duct connected to the lamp, a lamp inlet duct connected to the lamp, a first joint segment provided at the front end of the lamp outlet duct, a second joint segment provided at the front end of the lamp inlet duct, a first pipe whose one end is adjustably connected to the first joint segment, a third joint segment to which the other end of the first pipe is shiftably connected, a cooling mechanism section for cooling air, connected to the third joint segment, a fourth joint segment connected to a discharge section for discharging air cooled by the cooling mechanism section, and a second pipe whose one end is shiftably connected to the fourth joint segment, and the other end is shiftably connected to the second joint segment.

1 Claim, 9 Drawing Sheets

LAMP COOLING APPARATUS FOR ENABLING ADJUSTMENTS OF SETTING POSITIONS AND PROJECTION DISPLAY APPARATUS HAVING SUCH LAMP COOLING APPARATUS

CROSS-REFERENCE TO RELATED APPLICATIONS

This application claims priority from Japanese Patent Application No. 2006-257953 filed in the Japanese Patent Office on Sep. 22, 2006, the entire content of which is incorporated herein by reference.

BACKGROUND OF THE INVENTION

1. Field of the Invention

The present invention relates to a lamp cooling apparatus cooling a lamp used as a light source, and to a projection display device provided with the lamp cooling apparatus.

2. Description of Related Art

Various types of image display devices called rear projection display devices have been produced. In these rear projection display devices, a transmission type screen is arranged on the front side of the device, and an image is projected from the back side on the screen. As an image to be projected, an image light corresponding to an image displayed on the display panel is generated by using a lamp such as a xenon lamp as a light source, and guiding the light from the light source to enter a liquid crystal display panel such that the light transmit or reflect the liquid crystal display panel. The generated image light is then guided to enter the back side of the screen to display the image on the screen. In the liquid crystal display panel, the image light may be generated by either one of the following manners. That is, individual panel is used per each primary color signal, and image lights generated at each color panels are combined, or single panel is used to generate the image lights of the respective colors. Instead of the liquid crystal panel, micro mirrors may be driven independently to transform the light from the light source to an image light.

The abovementioned rear projection display devices enable relatively compact configurations of image light generating mechanism such as the light source or the liquid crystal display panel, and further enable the image to be displayed on a large screen. It is therefore relatively easy to obtain a device for displaying an image on a large screen. A screen size may be 50-inch or larger, for example.

Japanese Patent Application Publication No. JP 11-84533 describes an example of this type of the rear projection display devices. Further, Japanese Patent Application Publication No. JP 2003-157715 describes an example of the configuration of a lamp and its vicinity used in the rear projection display devices.

SUMMARY OF THE INVENTION

Meanwhile, as to the rear projection display devices, there are demands for a large size of the screen of the rear projection display device, and higher brightness of display images. Consequently, higher brightness light radiated from a lamp as a light source is demanded. Higher output of the power source for driving the lamp is required to increase the luminance of the lamp. The lamp has usually been driven at about 100 W, but in some cases, the lamp may be driven at a high power source of 200 W.

As described above, if the output of the power source for driving the lamp becomes high, there is a problem that the heating value of the lamp increases proportionally. Thus, it is important to surely cool the lamp by a lamp cooling mechanism.

On the other hand, an optical system, such as the lamp provided in the rear projection display device, is required to adjust an optical axis such that the light radiated from the lamp may be accurately projected to the setting position on the screen with the display panel in between. The optical axis adjustment is usually made in the manufacturing step in a factory. The setting position of the lamp in the rear projection display device is allowed to shift to some extent.

There has been a problem of technical difficulty in achieving compatibility between the attainment of a mechanism to permit a shift of setting position of the lamp and the arrangement of the mechanism to surely cool the lamp. That is, to cool the lamp efficiently, a mechanism is required in that, a radiator as a cooling mechanism is placed in the vicinity of the lamp, the radiator and the lamp are connected with a duct, such that the air heated by the lamp may be flown into the radiator, and the air cooled at the radiator may be returned to the lamp. For the above mechanism, a closed path is required. The reason for circulating the air for cooling the lamp into the closed path is to prevent dirt and dust from entering the vicinity of the lamp. This is because if the dirt or dust enters an optical path in the vicinity of the lamp, dust may be reflected into an image projected to the screen, and thus the image quality of the display image may be lowered.

Further, when the mechanism to permit the shift of the setting position of the lamp is provided for projection angle and projection range adjustments, it is necessary to provide a mechanism that enables the path of air for cooling the lamp to be changed in accordance with the setting position of the lamp. This extremely complicates the configuration to cool the lamp.

In view of the foregoing issues, it may be desirable to surely and simply cool the lamp by providing a mechanism that enables the setting position of the lamp to be shifted for adjusting the projection angle and the projection range of an image light to be projected to the screen.

According to an embodiment of the present invention, there is provided a lamp cooling apparatus which may include a lamp outlet duct connected to a lamp, and a lamp inlet duct connected to the lamp. A first joint segment may be provided at the front end of the lamp outlet duct. A second joint segment may be provided at the front end of the lamp inlet duct. The first and second joint segments may be connected to different pipes, in such a manner that the pipes are movable, and then connected to a cooling mechanism section via these pipes. The gas cooled by the cooling mechanism section may circulate between the lamp.

With this configuration, when the setting position of the lamp is adjusted for adjusting the projection angle and the projection range of an image light to be projected to a screen, the state of connections of the pipes with the respective joint segments may be shifted to permit adjustments of the setting positions of optical components such as the lamp or the like, while maintaining them as the path for cooling air to flow.

DETAILED DESCRIPTION

A preferred embodiment of the present invention will be described below with reference to the accompanying drawings.

Figure 1:
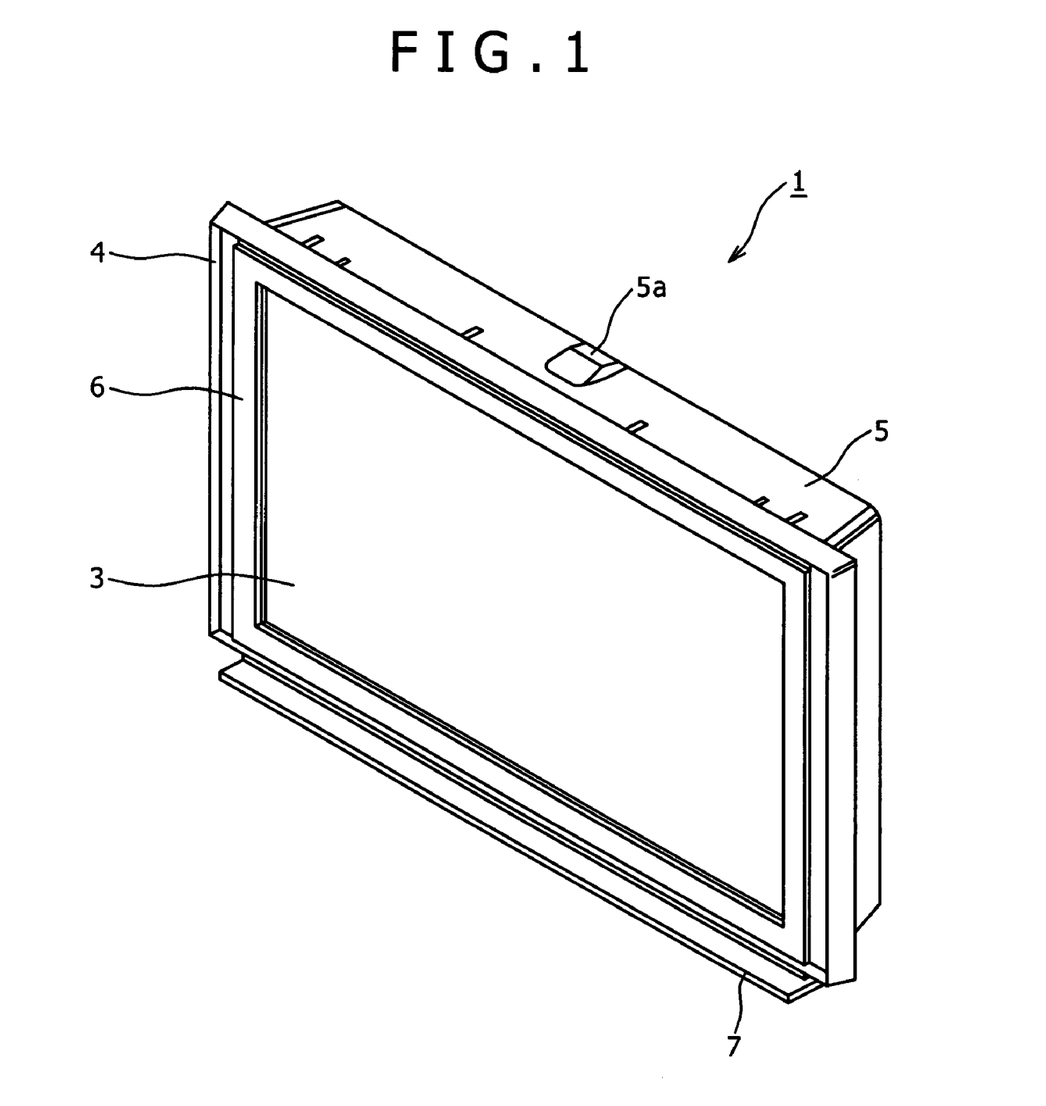
FIG. 1 is an external perspective view, viewed from the front of a rear projection display device according to an example of a preferred embodiment of the present invention.
Figure 2:
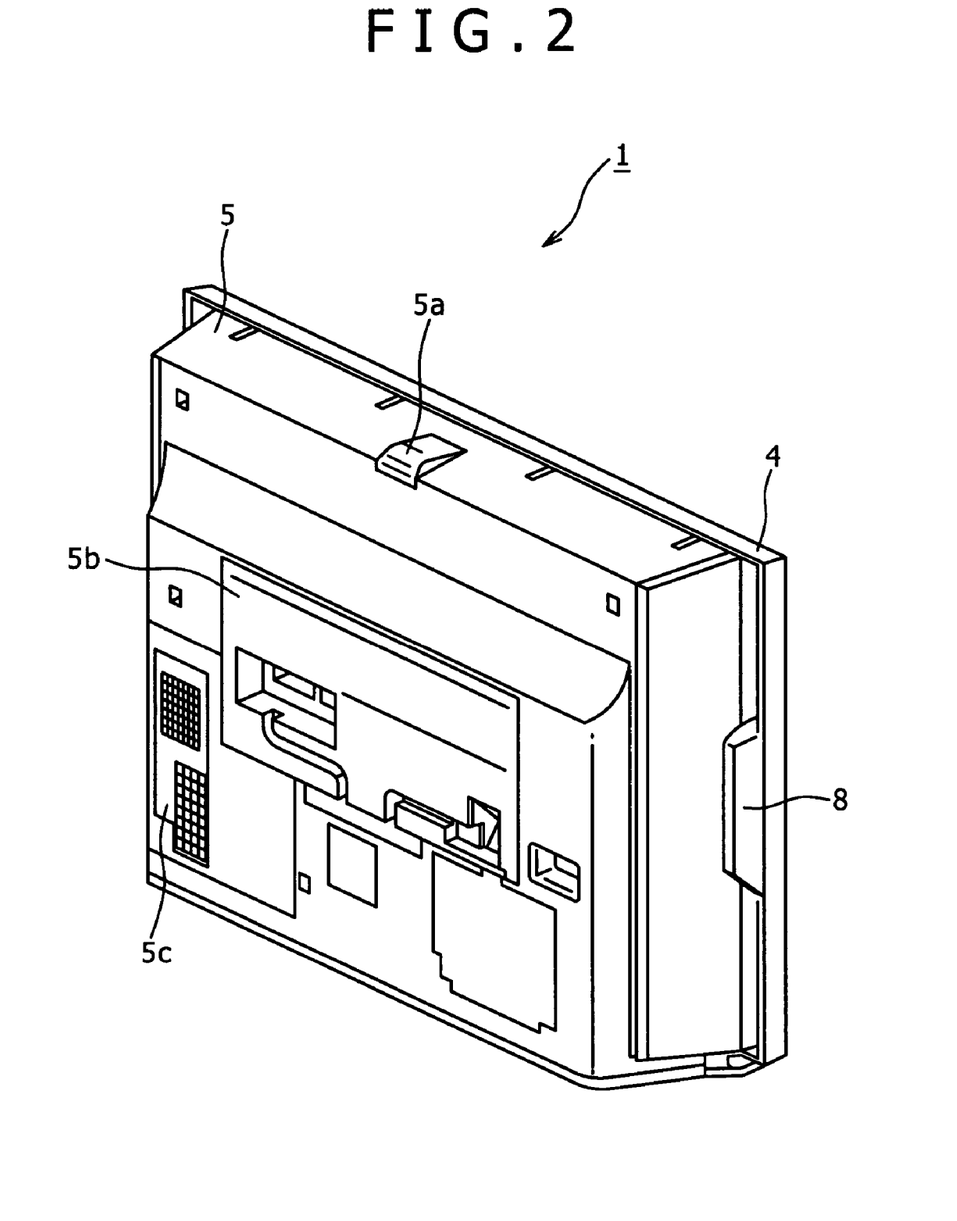
FIG. 2 is an external perspective view, viewed from the back of the rear projection display device in FIG. 1.

FIG. 1 shows a perspective view when viewed from the front side of a rear projection display device of the preferred embodiment. FIG. 2 shows a perspective view when viewed from the back side of the rear projection display device. Further, FIG. 3 shows a perspective view when the internal configuration of the rear projection display device is viewed from the back side.

In this embodiment, an image display screen of the rear projection display device has a size of 50-inch, and the depth thereof is as thin as 30 cm, for example.

Figure 3:
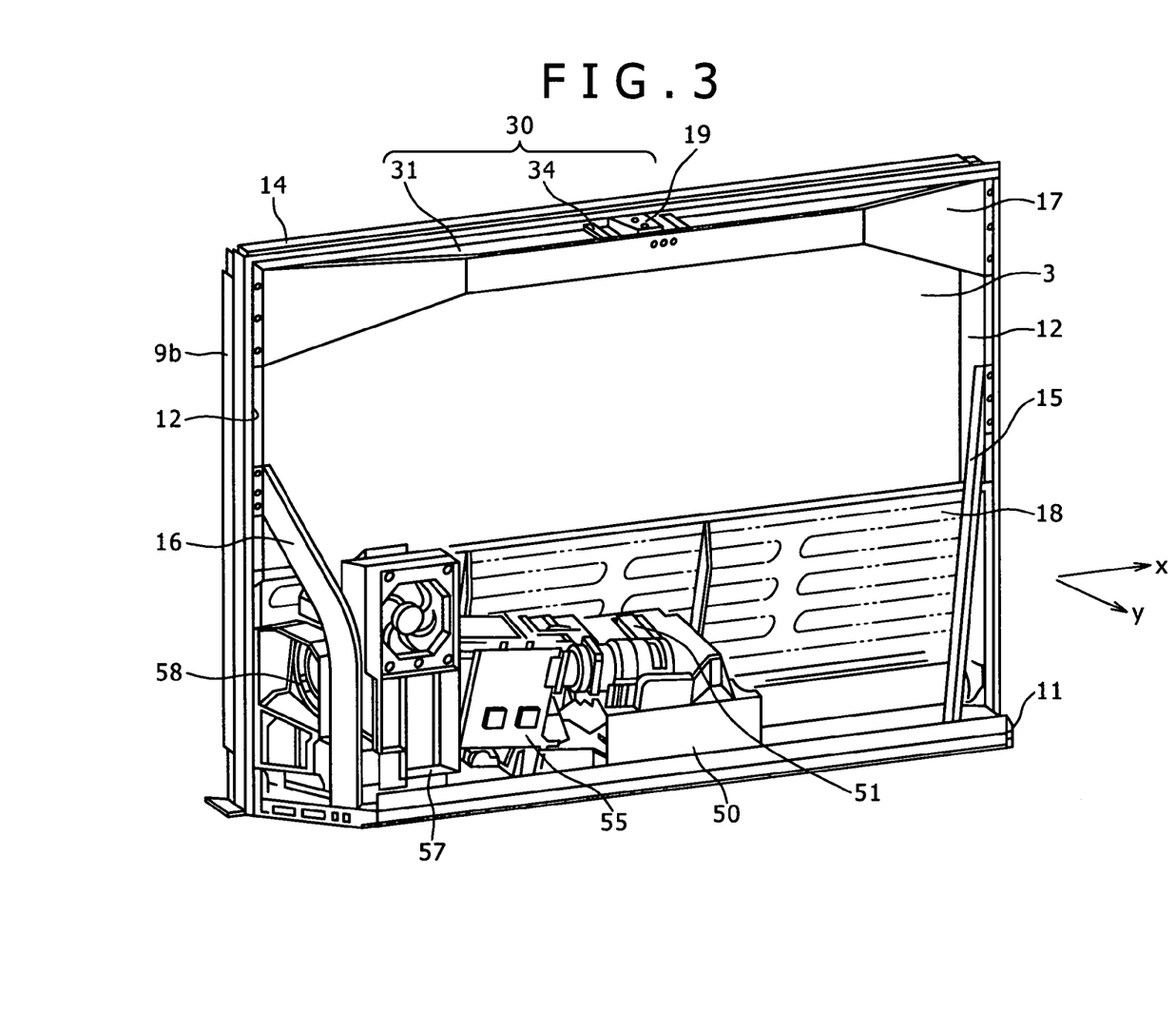
FIG. 3 is a perspective view, when the interior of the rear projection display device in FIG. 1 is viewed from the back side.

In FIGS. 1 to 3, reference numeral 1 represents a rear projection display device. As shown in FIG. 1, the rear projection display device 1 has a screen 3 on the front side, and is provided with an outer frame 4 and a cover frame 6 on the front side, and a rear cover 5 on the back side. In this embodiment, the outer frame 4, the cover frame 6 and the rear cover 5 form a cabinet or an outer case of the rear projection display device.

The screen 3 is produced in such a manner that a front transparent glass plate and a back transparent glass plate keep predetermined space in between. The front transparent glass plate has a lusterless finished surface, and a back to which a lenticular sheet is attached. The back transparent glass sheet has a Fresnel lens sheet attached to the back side of the screen 3.

Further, as shown in FIG. 1, the cover frame 6 having a rectangular shape is mounted around the screen 3 on the front side, and more further, the outer frame 4 having an oblong rectangular shape is mounted around the cover frame 6. The rear cover 5 is disposed on the back of the screen 3 to cover the whole of the back, as shown in FIG. 2.

In FIG. 1, reference numeral 7 represents a leg cover of the rear projection display device 1.

As shown in FIG. 2, the rear cover 5 provided on the back side of the rear projection display device 1, has a mirror adjusting section cap 5a disposed at the upper part of the rear cover 5, a box-shape recessed cover 5b for housing an electric circuit unit (not shown), and an air cooling fan cover 5c disposed at a position corresponding to an air cooling fan unit which is provided in a lamp house 58 in order to cool a radiator 200, which will be described later.

Further, as shown in FIG. 2, a speaker unit 8 provided integrally with a decorative panel on the front side is disposed in a lengthwise region formed between the left outer frame 4 and the right rear cover 5.

FIG. 3 shows a situation where the rear cover 5 is removed. In the configuration shown in FIG. 3, on the back of a bottom frame 11, there are the lamp house 58, an air-cooling fan unit 57, and an optical unit 50. The optical unit 50 resolves the light of the lamp into three primary colors of light, red (R), green (G) and blue (B), and generates and then synthesizes three color images through three liquid crystal panels (not shown), and thereafter projects these images from a projection window 51. In the present embodiment, the three liquid crystal panels are reflective-type liquid crystal display panels. It is noted, in FIG. 3, reference numeral 55 represents a projection control circuit board for controlling the images of the three liquid crystal panels built in the optical unit 50.

As shown in FIG. 3, on the back, a left frame support 16 is disposed between a left side frame 12 and the bottom frame 11, and a right frame support 15 is disposed between a right side frame 13 and the bottom frame 11. Further, a shade plate 18 is disposed between the bottom frame 11 and the left and right side frames 12 and 13. The shade plate 18 has two functions: avoiding the influence of the light leaked from the optical unit 50 on the screen 3, and reinforcing the abovementioned frames.

A mirror support 17 made of a sheet metal subjected to bending is disposed at the upper ends of the left and right side frames 12 and 13, respectively, as shown in FIG. 3. The bent shape of the mirror support 17 when viewed from above is arranged to form a trapezoidal shape frame by a top frame 14. A mirror fixing plate 19 is provided at nearly centrally between the top frame 14 and the mirror support 17 so as to bridge therebetween.

The principle of projection of an image light to the screen 3 under the abovementioned configuration will be described with reference to FIG. 4.

Figure 4:
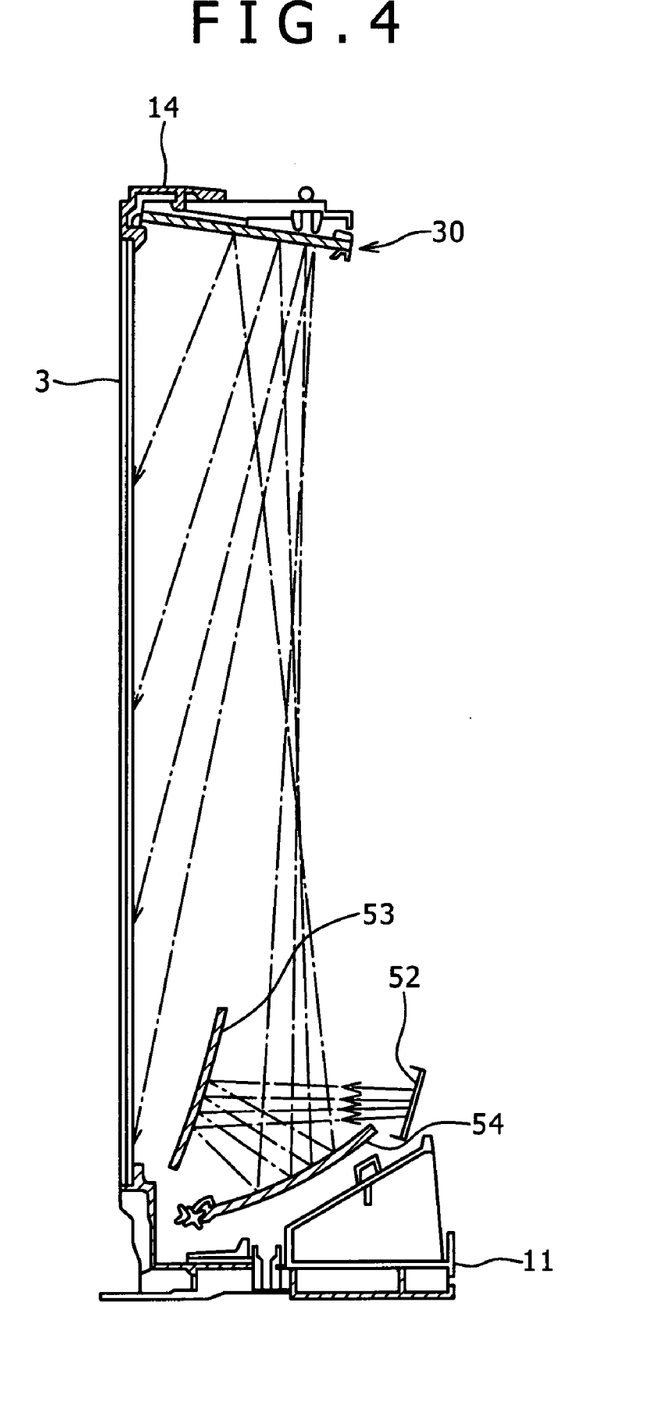
FIG. 4 is an explanatory drawing illustrating an example of the optical path of a projected image from the rear projection display device according to an embodiment of the present invention.
Figure 5:
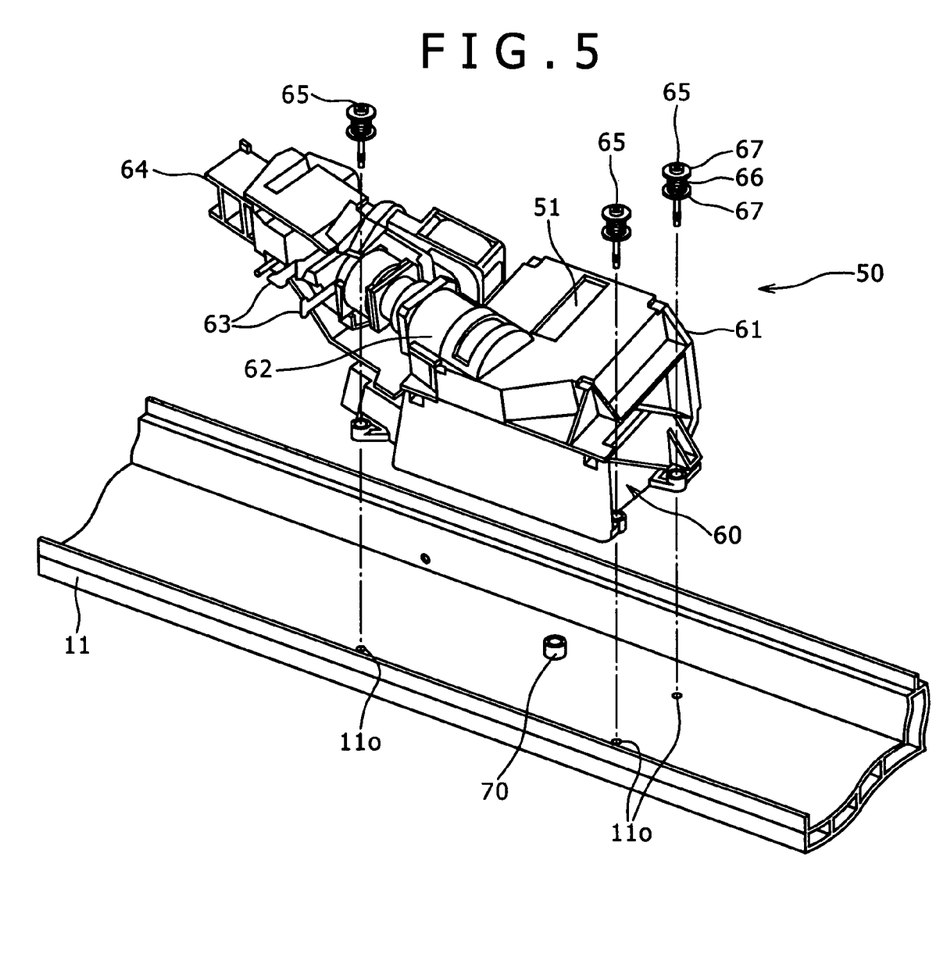
FIG. 5 is a perspective view for explaining an example of situations how an optical unit is attached to a frame in the rear projection display device according to an embodiment of the present invention.

FIG. 4 shows the inside of a mirror housing section 61 (FIG. 5) in the optical unit 50, and the process where the light emitted from the mirror housing section 61 is projected to the back of the screen 3. The light from the lamp is reflected at the liquid crystal panels and then synthesized, and thereafter guided to enter a flat mirror 52 in the mirror housing section 61 as shown in FIG. 5. In FIG. 4, the optical path up to where the light enters the flat mirror 52 is omitted. The optical path is bent about 90 degrees by the flat mirror 52, and then the light enters a convex mirror 53. The light with the image reflected from the convex mirror 53 is further reflected at an aspherical mirror 54, and passes through the projection window 51 shown in FIG. 3. This light is then reflected at a flat mirror 31, which is one of the components of a projection mirror 30, and projected to the screen 3 on the front.

The optical unit 50, thus generating the image light to be projected to the screen 3, is configured to permit its position adjustment relative to the bottom frame 11.

That is, as shown in FIG. 5 as a perspective view, the optical unit 50 includes the mirror housing section 61 having the projection window 51, a projection lens housing section 62, a liquid crystal projection device 63, a capture section 64, a lamp 90 (refer to FIG. 6) for supplying light to the capture section 64, and a base block 60 disposed below the mirror housing section 61. The projection lens housing section 62 is integrally provided with the mirror housing section 61, and houses a projection lens (not shown). The liquid crystal projection device 63 synthesizes different image signals of three colors, R, G and B, and emits the light of a color image to the projection lens housing section 62. The capture section 64 performs color adjustment of the light from the light source, and supplies white light to the liquid crystal projection device 63.

The lamp 90 is attached and positioned, through an adaptor 85, to the capture section 64 of the optical unit 50. The liquid crystal projection device 63 and the capture section 64 in the optical unit 50 are assembled in advance such that a specified positional relation is mutually kept with positioning pins or the like (not shown), and then positioned and fixed to the base block 60. The mirror housing section 61 and the projection lens housing section 62 are, in the integrated state thereof, positioned and fixed to the base block 60.

The optical unit 50 is mounted such that the base block 60 may be rotatably engaged with a rotation shaft 70 as a rotating reference provided on the bottom frame 11 of a frame structure, as shown in FIG. 5. In the optical unit 50, fixing pins 65, each having a compression coil spring 66 as a first elastic body, are engaged to three locations in the periphery of the base block 60, respectively. This enables the optical unit 50 to move slightly around the rotation shaft 70, with secure engagement of the optical unit 50 on the bottom frame 11.

That is, the rear projection display device of the present embodiment is configured to make adjustments of the projection angle and the projection range of an image by rotation and slight movement of the base block 60 of the optical unit 50 on the rotation shaft 70. Although in FIG. 5, there is shown a situation where the lamp 90 is not attached to the optical unit 50, the lamp 90 is attached to the capture section 64 with the adaptor 85 shown in FIG. 6 in between. In situations where the lamp 90 is attached, the lamp 90 is integrally rotated with the optical unit 50 around the rotation shaft 70, by adjusting the projection angle and the projection range of the image.

Each of the fixing pins 65 has the compression coil spring 66 as the first elastic body, which is disposed between two washers 67 and 67. Thus, a large pressing force resulting from the force exerted by the compression coil springs 66 may be generated when the fixing pins are fixed to the three locations in the periphery of the base block 60. A pressing mechanism includes the fixing pins 65, the two washers 67 and 67, and the compression coil springs 66.

The configuration of the lamp 90 and the cooling mechanism for air-cooling the lamp 90 will be described with reference to FIG. 6 and the succeeding drawings.

Figure 6:
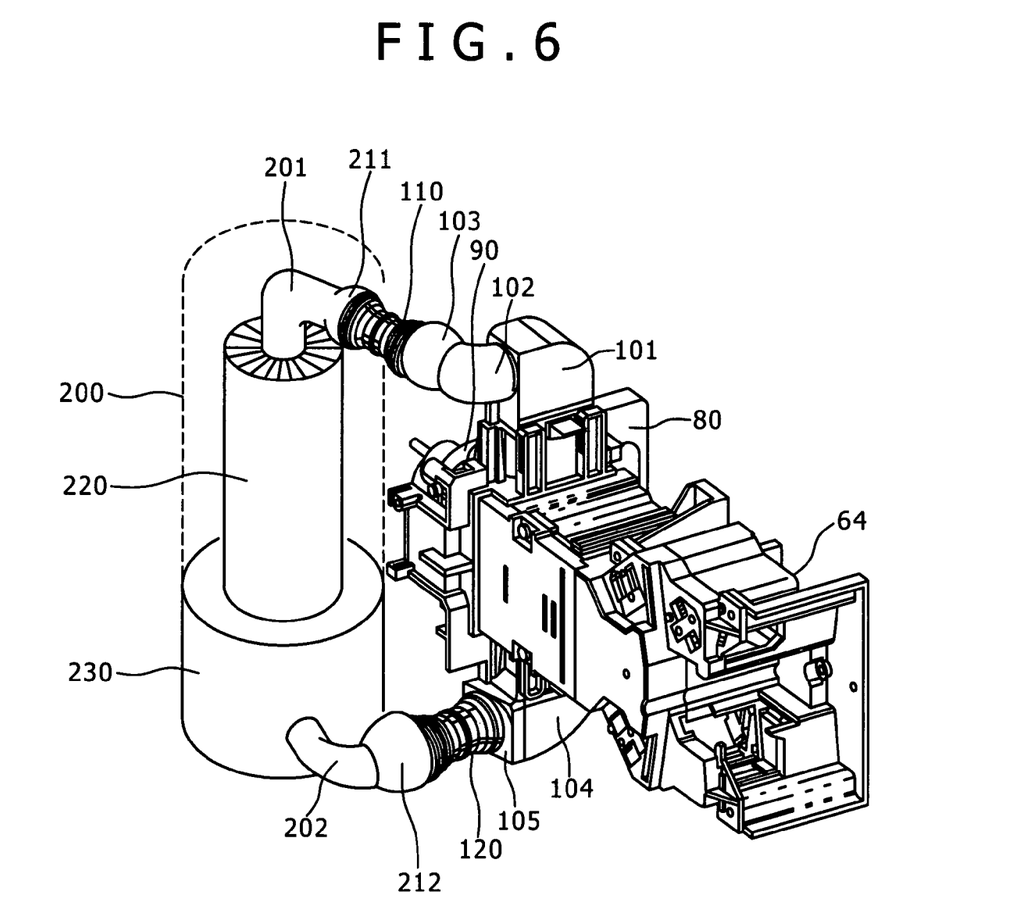
FIG. 6 is a perspective view illustrating an example of the configuration of a lamp section attached to the optical unit in the example of FIG. 5.

FIG. 6 shows an adaptor 80 of the lamp 90, which is attached to the capture section 64 of the optical unit 50, and the configuration in the vicinity of the adaptor 80. A portion of the lamp 90 is integrally attached to the optical unit 50 shown in FIG. 5, and integrally rotates together when the projection angle or the projection range of an image are adjusted. In contrast, a radiator 200 for cooling the lamp 90 is fixed to the bottom frame 11, and does not move even when the projection angle or the projection range is adjusted. In FIG. 6, the broken line represents a part of the radiator 200.

The adaptor 80 shown in FIG. 6 is positioned in the lamp house 58 shown in FIG. 3. By forcing the lamp 90 into the lamp house 58, the electrodes of the lamp 90 are connected to a power supply line on the side of the optical unit 50, with a connector (not shown in the figure) equipped at the adaptor 80 in between.

Although the detail of the lamp 90 is not shown in a figure, the lamp 90 has the following configuration. That is, light-emitting elements (electrodes) as a light source are provided in a reflector as a reflecting member, and a hole for introducing air for cooling into the reflector, and a hole for discharging the air for cooling to the exterior are provided in the reflector. A duct 101 shown in FIG. 6 is connected to the hole for discharging the air for cooling to the exterior, and a tubular duct 102 is connected to the duct 101. The ducts 101 and 102 are formed by resin.

A spherical joint segment 103 is provided at the front end of the duct 102. Joint segments 105, 211 and 212 described later have the same shape. One end of a movable pipe 110 is shiftably inserted and connected to the spherical joint segment 103.

The movable pipe 110 is extendable, and its both ends are spherical. When the movable pipe 110 is press-inserted into the spherical joint segment, it is rotatably connected to the joint segment. The detailed shape of the movable pipe 110 will be described later.

The other end of the movable pipe 110 is rotatably connected to the joint segment 211 on the side of the radiator 200. The joint segment 211 is connected to the upper end of a metal cylinder 220 with a duct 201 in between. The metal cylinder 220 in the radiator 200, which constitutes the cooling mechanism, is made of a metal material having a high thermal conductivity, such as aluminum, and a plurality of heat absorbing fins are provided in the metal cylinder. On the outside of the metal cylinder 220 of the radiator 200, a cooling fan unit 57 shown in FIG. 3 is provided to discharge the ambient air around the metal cylinder 220 to the exterior. A blower 230 is connected to the lower end of the metal cylinder 220. The blower 230 sucks air from the lower end of the metal cylinder 220, and pushes air to the duct 202 connected to the blower 230.

The joint segment 212 is connected to the front end of the duct 202. One end of a movable pipe 120 is rotatably connected to the joint segment 212. The other end of the movable pipe 120 is rotatably connected to the joint segment 105, which is the front end of a duct 104 on the side of the optical unit 50. The duct 104 is connected to the hole for introducing the air for cooling the lamp 90, and introduces the air supplied from the blower 230 into the lamp 90 with the hole in between.

With this configuration, when the blower 230 is operated, the air cooled in the metal cylinder 220 and then exhausted from the blower 230 is fed into the reflector of the lamp 90 through the duct 202, the movable pipe 120 and the duct 104. The air discharged from the reflector of the lamp 90 is cooled by being fed into the metal cylinder 220 in the radiator 200 through the duct 101, 102, the movable pipe 110 and the duct 201. Thus, the closed path of air (gas) for cooling the lamp 90 is configured.

Figure 7:
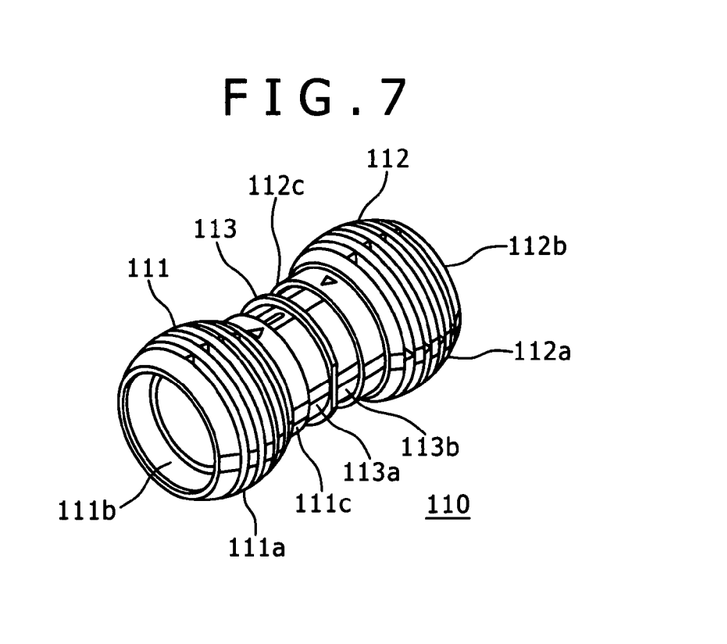
FIG. 7 is a perspective view illustrating an example of a movable pipe according to an embodiment of the present invention.
Figure 8:
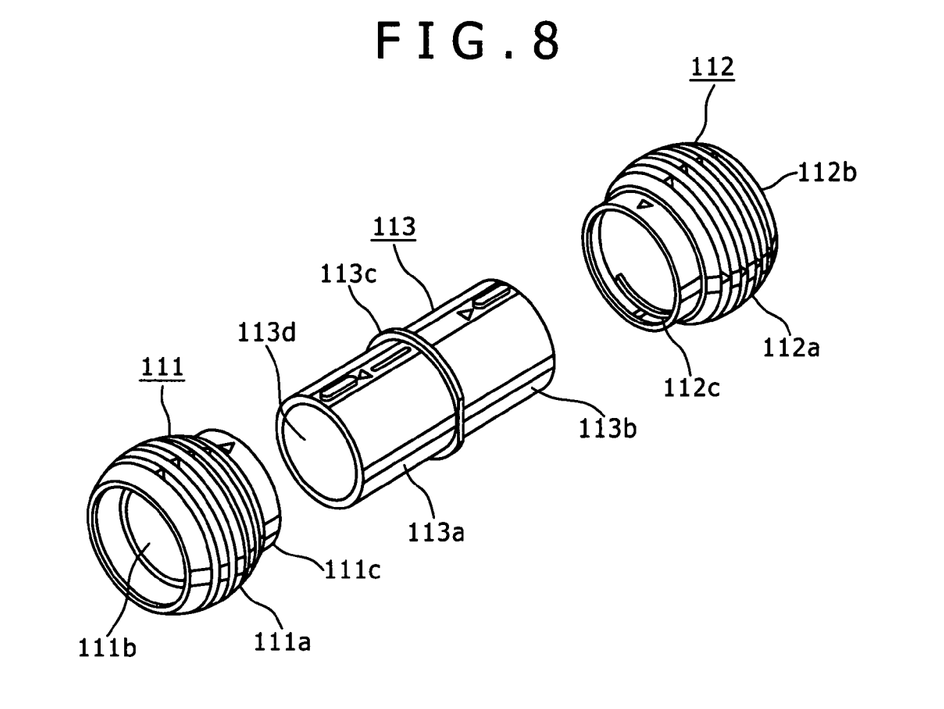
FIG. 8 is a disassembled perspective view illustrating, in a disassembled state, the movable pipe in FIG. 7.
Figure 9:
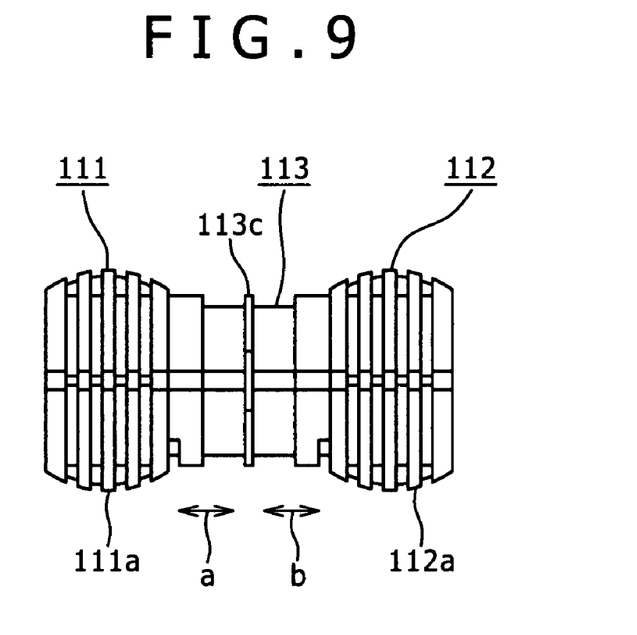
FIG. 9 is a plan view of the movable pipe in FIG. 7, viewed from the side thereof.
Figure 10:
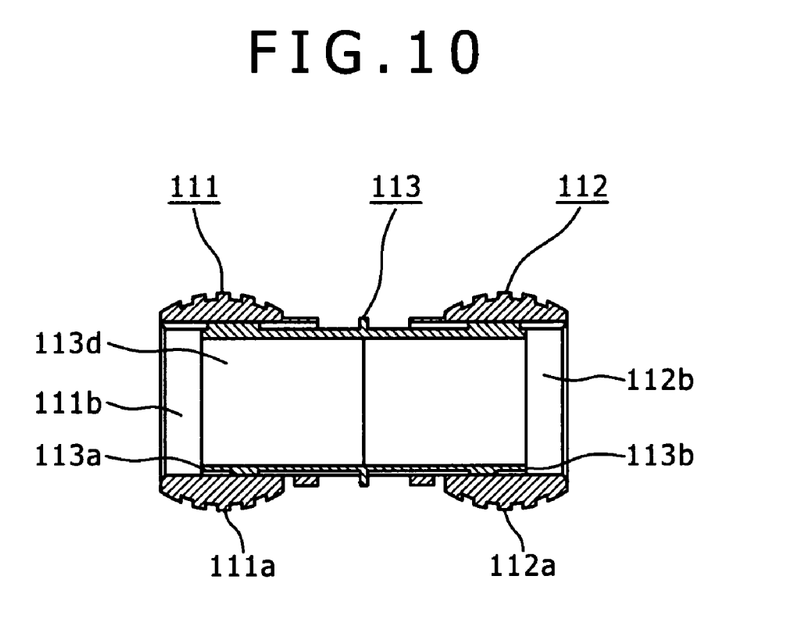
FIG. 10 is a sectional view of FIG. 9, specifically a schematic diagram for explaining the configuration of a lamp cooling apparatus in the rear projection display device according to an embodiment of the present invention.

FIG. 7 shows an example of the configuration of the movable pipe 110. This is common to the movable pipe 120 in the present embodiment. The movable pipes 110 and 120 are components formed by resin. The movable pipe 110 is formed by a combination of three members 111, 112 and 113. FIG. 8 shows a state where these three members 111, 112 and 113 are disassembled. FIG. 9 is a side view of the state of FIG. 7. FIG. 10 is a sectional view of the state of FIG. 9. As shown in these drawings, the spherical members 111 and 112 are connected to each other with the cylindrical member 113 in between. In the spherical member 111, a cavity 111b is formed in a spherical segment 111a, and a cylindrical member connecting segment 111c is formed at the rear end of the cavity 111b. Similarly, in the spherical member 112, a cavity 112b is formed in a spherical segment 112a, and a cylindrical member connecting segment 112c is formed at the rear end of the cavity 112b. The cylindrical member 113 has an end segment 113a to be inserted into the connecting segment 111c of the spherical member 111, another end segment 113b to be inserted into the connecting segment 112c of the spherical member 112, and a central flange segment 113c. A cavity 113d is formed on the inside of the cylindrical member 113. The cavities 111b, 112b and 113b in these members 111, 112 and 113, respectively, form a flow path for the air for cooling.

Referring to FIGS. 9 and 10, the connection or joining is made by inserting the one end segment 113a of the cylindrical member 113 into the spherical member 111. The connection is adjustable by freely setting the amount of insertion as indicated by the arrow a in FIG. 9. Similarly, the connection is made by inserting another end segment 113b of the cylindrical member 113 into the spherical member 112. The connection may be adjustable by freely setting the amount of insertion as indicated by the arrow b in FIG. 9. Therefore, the movable pipe 110 has an extendable construction. The spherical segments 111a and 112a of the spherical members 111 and 112 in the present embodiment are provided with grooves arranged in parallel and at predetermined intervals to reduce the amount of the resin material for use, but alternatively, there may be a case where these grooves are not provided.

Figure 11:
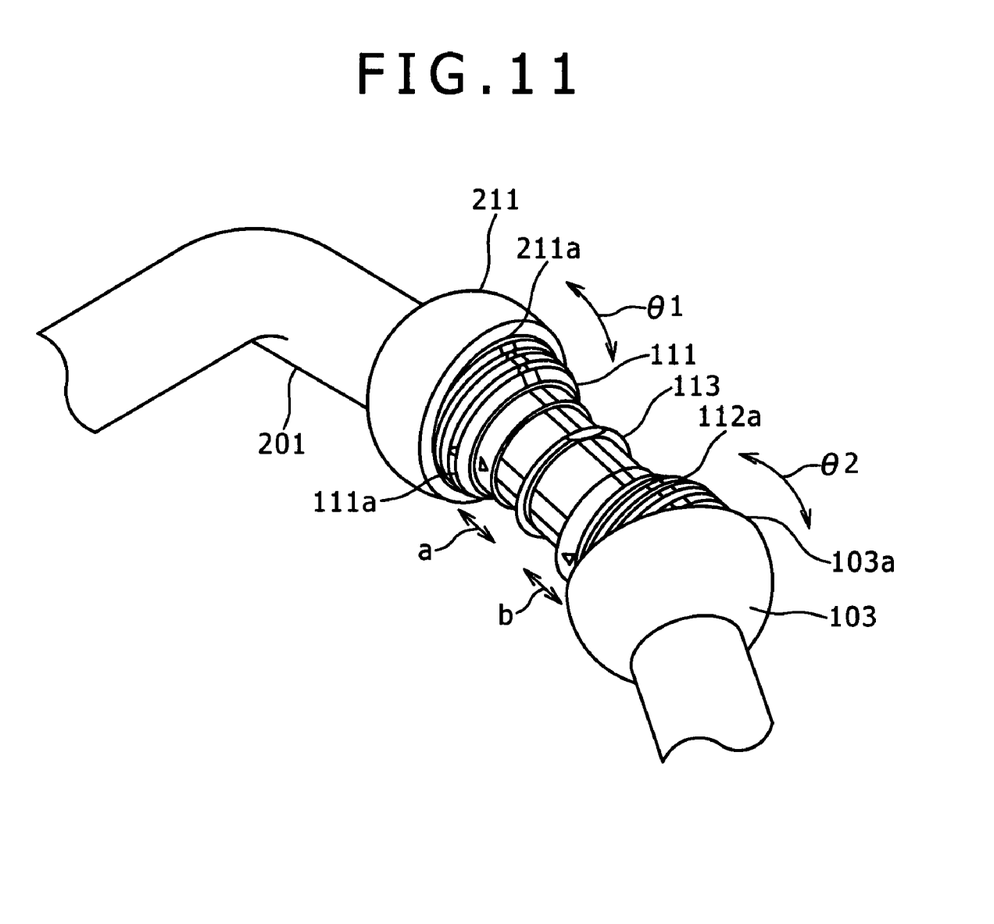
FIG. 11 is an explanatory drawing illustrating an example of states how the movable pipe and joint segments are connected.

FIG. 11 shows a state where the movable pipe 110 thus constructed is attached to the joint segments 103 and 211. As shown in FIG. 11, the spherical segment 111a of the spherical member 111 of the movable pipe 110 is fit in a spherical hole segment 211a of the joint segment 211 on the side of the radiator. Also, the spherical segment 112a of the spherical member 112 of the movable pipe 110 is fit in a spherical hole segment 103a of the joint segment 103 on the side of the lamp. Each of the joint segments is shiftable such that the angle formed with the movable pipe 110 may be freely adjustable as indicated by the angles θ1 and θ2 in FIG. 11. Further, the movable pipe 110 itself is freely extendable as indicated by the arrows a and b in FIG. 11. Similarly with the state of FIG. 11, connection between another movable pipe 120 and the joint segments 212 and 105 may be adjustable.

In the above configuration, the movable pipe is used to connect the duct 201 connected to the side of the radiator fixed to the bottom frame in the rear projection display device, and the duct 103 connected to the side of the lamp which is shiftable for adjustments of the projection angle and the projection range with respect to the screen. Accordingly, even if the position of the side of the lamp is shifted for adjustments, the connection state with ducts may be maintained by movements indicated by the angles θ1 and θ2, and the movements indicated by the arrows a and b, and the closed line configuration for flowing the air for cooling is retained.

According to embodiments described above, the optical block in the rear projection display device may be rotatable for adjustments of the projection angle and the projection range to the screen. Even when the adjustments are made by the rotation of the optical block, the position of the flow path of the air for cooling the lamp, such as the duct provided in the optical block is fixed to permit continuous connection to the side of the radiator, and thus, the lamp may be efficiently cooled.

It is noted that shapes of the respective members in the foregoing embodiments are described by way of an example, and their shapes may be changed as long as they are members having the same function. For example, the movable pipe shown in FIGS. 7 and 8 is moved by the connection of three members, but instead, there may be a case where a movable pipe may be moved by connecting two members.

Also, in the overall configuration of the rear projection display device, the projection mirror is provided on the upper portion in forgoing embodiment, as shown in FIG. 4, but there may be a case where the projection mirror is provided on the rear (on the side of the rear cover). Additionally, any cooling means other than the radiator 200 shown in FIG. 6 may be employed as a cooling mechanism.

According to an embodiment of the present invention, there is provided an excellent configuration in which the compatibility is kept between the mechanism that the path of the air for cooling may be maintained to retain the cooling performance of the lamp, and the mechanism that the projection angle or the projection range may be adjusted, even though the setting positions of the optical components such as the lamp or the like are adjusted.

It should be understood by those skilled in the art that various modifications, combinations, sub-combinations and alterations may occur depending on design requirements and other factors insofar as they are within the scope of the appended claims or the equivalents thereof.

The invention claimed is:

1. A projection display apparatus provided with a light source for forming an image light to be projected on a screen, the apparatus comprising:
   a lamp as the light source;
   a lamp outlet duct connected to the lamp;
   a lamp inlet duct connected to the lamp;
   a first joint segment provided at the front end of the lamp outlet duct;
   a second joint segment provided at the front end of the lamp inlet duct;
   a first pipe whose one end is shiftably connected to the first joint segment;
   a third joint segment to which the other end of the first pipe is shiftably connected;
   a cooling mechanism section for cooling air, connected to the third joint segment;
   a fourth joint segment connected to a discharge section for discharging air cooled by the cooling mechanism section; and
   a second pipe whose one end is shiftably connected to the fourth joint segment, and the other end is shiftably connected to the second joint segment,
   wherein the air cooled by the cooling mechanism section circulates between the cooling mechanism section and the lamp,
   wherein each of the first pipe and the second pipe is formed by two or more members in which one member thereof is insertable into another member such that each of the first pipe and the second pipe is extendable, and in which each said end of the first pipe and the second pipe has a spherical segment with a plurality of parallel grooves arranged on an outer surface thereof such that each groove extends continuously around the respective outer surface so as to be a discrete groove which does not intersect any other groove,
   wherein a mating end of each of the first joint segment and third joint segment which mates with the first pipe is a spherical hole segment, and a mating end of each of the second joint segment and fourth joint segment which mates with the second pipe is a spherical hole segment, such that an angular arrangement between any of (i) the first pipe and the first joint segment, (ii) the first pipe and the third joint segment, (iii) the second pipe and the second joint segment, or (iv) the second pipe and the fourth joint segment, is freely adjustable, and wherein a fitting position of the cooling mechanism section is fixed in the projection display apparatus, a fitting position of the lamp is shiftable by adjusting a projection angle or a projection range of the image light to be projected on a screen, and a connected state of the first pipe or the second pipe becomes shiftable or angularly rotatable at one or more of the first, second, third and fourth joint segments when the fitting position of the lamp is shifted to adjust the projection angle or the projection range.

* * * * *